United States Patent
Bouldin

(10) Patent No.: US 7,264,667 B2
(45) Date of Patent: Sep. 4, 2007

(54) PRETREATED AGGREGATE FOR HOTMIX ASPHALT CONCRETE APPLICATIONS AND OTHER RELATED APPLICATIONS

(75) Inventor: Mark G. Bouldin, Fair Oaks Ranch, TX (US)

(73) Assignee: American Gilsonite Company, Inc., Palo Alto, CA (US)

( * ) Notice: Subject to any disclaimer, the term of this patent is extended or adjusted under 35 U.S.C. 154(b) by 0 days.

(21) Appl. No.: 11/181,229

(22) Filed: Jul. 14, 2005

(65) Prior Publication Data

US 2006/0011102 A1 Jan. 19, 2006

Related U.S. Application Data

(60) Provisional application No. 60/588,207, filed on Jul. 15, 2004.

(51) Int. Cl.
*C08L 95/00* (2006.01)
*C09D 195/00* (2006.01)

(52) U.S. Cl. .............. 106/281.1; 106/270; 106/502; 428/404

(58) Field of Classification Search .............. 106/270, 106/281.1, 502; 428/404
See application file for complete search history.

(56) References Cited

U.S. PATENT DOCUMENTS

| | | | | |
|---|---|---|---|---|
| 1,884,471 A | * | 10/1932 | Wittenberg | ............ 428/404 |
| 2,086,968 A | * | 7/1937 | Stafford | ............ 208/23 |
| 2,609,305 A | * | 9/1952 | Roediger | ............ 106/281.1 |
| 3,855,167 A | * | 12/1974 | Bowman | ............ 523/208 |
| 4,077,928 A | | 3/1978 | Koons | |
| 4,168,987 A | | 9/1979 | Blackmon, Sr. | |
| 4,265,563 A | | 5/1981 | Marzocchi et al. | |
| 4,410,367 A | * | 10/1983 | LeGrand | ............ 106/284.06 |
| 4,430,465 A | | 2/1984 | Abbott | |
| 4,471,094 A | | 9/1984 | Uffner et al. | |
| 4,654,385 A | | 3/1987 | Roberts et al. | |
| 5,009,543 A | | 4/1991 | Ahmad et al. | |
| 5,106,227 A | | 4/1992 | Ahmad et al. | |
| 5,217,530 A | * | 6/1993 | Grzybowski | ............ 106/163.01 |
| 5,219,901 A | * | 6/1993 | Burke et al. | ............ 523/205 |
| 5,223,031 A | | 6/1993 | Sugi et al. | |
| 5,236,276 A | | 8/1993 | Chang et al. | |
| 5,262,240 A | * | 11/1993 | Dunning et al. | ............ 428/404 |
| 5,494,741 A | | 2/1996 | Fekete et al. | |
| 5,503,871 A | | 4/1996 | Blacklidge et al. | |
| 5,941,656 A | | 8/1999 | Sugiyama et al. | |

FOREIGN PATENT DOCUMENTS

| | | | |
|---|---|---|---|
| DE | 3703775 A1 | * | 8/1988 |
| EP | 1138721 A | * | 10/2001 |
| FR | 826789 A | * | 4/1938 |
| GB | 167341 A | * | 8/1911 |
| GB | 536584 A | * | 5/1941 |
| RU | 1778091 A1 | * | 11/1992 |
| RU | 2186746 C1 | * | 8/2002 |

OTHER PUBLICATIONS

Report from Mr. Thor Evensen—Retired Laboratory Manager, City of Oslo, the Asphalt Works at Huken, Oslo, Mar. 9, 1987.
Call Report, City of Oslo, Mar. 10, 1987.
Gilsonite Resin—A Modifier for High Stability Pavements by Knut Dokken and Thor Evensen, Nov. 1987, http://www.americangilosonite.com/asphalt_oslo.html, page last updated Oct. 29, 2001.
American Gilsonite Company's Recommendations for Mixing Gilsonite Resin into Road Paving Mixes, http://www.americangilsonite.com/asphalt_mix.html, page last updated Oct. 29, 2001.
State Highway 29—North Carolina, http://www.americangilsonite.com/asphalt_highway29.html, page last updated Jan. 27, 2003.
UDOT'S Experience With AggCote, Oct. 2003.

* cited by examiner

*Primary Examiner*—David M. Brunsman
(74) *Attorney, Agent, or Firm*—Townsend and Townsend and Crew LLP

(57) ABSTRACT

A process of producing an asphalt concrete with enhanced performance is provided by utilizing a primer. The primer is added to a hot aggregate with a surface temperature of at least 250 deg. F. prior to addition of an asphalt-derived base binder. The primer forms a primer interlayer between the hot aggregate and the base binder. As a result, the asphalt concrete has enhanced performance when compared with other asphalt concretes produced without a primer being added.

23 Claims, 10 Drawing Sheets

PRETREATED AGGREGATE FOR HOTMIX ASPHALT CONCRETE APPLICATIONS AND OTHER RELATED APPLICATIONS

RELATED APPLICATIONS

This patent application claims priority to U.S. Provisional Patent Application Ser. No. 60/588,207 filed on Jul. 15, 2004, now abandoned, which is incorporated by reference in its entirety.

BACKGROUND OF THE INVENTION

1. Technical Field of the Invention

The present invention relates generally to the field of hotmix asphalt concrete and asphalt technology. More specifically, the present invention relates to the pretreatment or priming of aggregate for use with asphalt or other petroleum-derived binders.

2. Description of the Related Art

The current practice to produce hotmix asphalt concrete is to heat up aggregate either in a continuous drum or batch hotmix asphalt concrete plant and spray asphalt binder onto the very hot aggregate. The combination of these two components is an asphalt binder-aggregate product used to create pavement. The asphalt binder provides flexibility to the resulting asphalt binder-aggregate product and is therefore used to ease the constructability of pavements. However, a drawback to the asphalt-aggregate product is that adhesion strength of the binder to the aggregate is comparatively low and the binder is essentially a high viscosity fluid, as opposed to a solid at room temperature, such that the asphalt binder-aggregate interface created by mixing the two represents a weak-spot where failure can occur. In particular, water, which is very polar, can penetrate the product and separate the binder from the aggregate. This is generally caused by either freeze-thaw cycles or via pump action of the water in the voids during traffic loading. Once the adhesion between the binder and the aggregate is lost the pavement can unravel. Commonly used tests to evaluate the susceptibility of mixes to water damage are the modified Lotman test (AASHTO T283) and the Hamburg Wheel Tracking (HWT) Test, as understood by those of skill in the art. To meet the test specification requirements, it is known to use lime, hydrated lime or lime marination of the aggregate. It is also known to add a liquid amine antistripping agent to the asphalt binder.

Efforts to overcome low temperature and fatigue cracking issues have led to the development of the products noted above which in turn suffer from rutting and shoving over periods of use. It is possible to improve the rut resistance with conventional and polymer-modified asphalts; however, this is generally accomplished by sacrificing the low temperature binder properties. Polymer modification does not, generally, improve the intermediate temperature properties. Furthermore, polymer addition accounts for a significant increase in cost. It is desirable to develop a product and process to create the product that overcomes low temperature and fatigue cracking issues while resisting rutting and shoving with use.

Attempts have been made to improve interfacial properties in asphalt mixtures to increase performance. For example, U.S. Pat. No. 5,223,031 by Sugi et al. titled "Cement/Asphalt Mixtures and Processed for Preparation of the Same" provides a cement/asphalt mixture comprising an aggregate, an asphalt emulsion, cement, a hydraulic inorganic material and water, characterized in that the surfaces of aggregate fragments are covered with the asphalt particles prepared by the coalescence of asphalt emulsion and that the hydraulic inorganic material and water are present in the interstices between the aggregate fragments. The cement/asphalt mixtures is prepared through a process characterized by the steps of adding a cationic or anionic asphalt emulsion to an aggregate and mixing the two by stirring with a mixer for about 10 to 60 seconds. Afterwards, the resulting mixture is further mixed with a hydraulic inorganic material to produce the cement/asphalt mixture. During the process, the aggregate can be heated to a temperature of lower than 120 deg. C. (i.e., lower than 248 deg. F.) to accelerate the coalescence of asphalt emulsion when the operation is conducted in a cold environment.

In Europe, in particular, contractors and refiners have promoted the use of ultra-high modulus binders to reduce traffic-induced deformation. Because of the moderate climate in most of South-central Europe, the reduction in low temperature performance has not been a cause of concern. However, in the United States, Northern Europe, as well as Eastern Europe, the climatic conditions are much more severe and have led to disadvantages. Because of their propensity to exhibit severe cracking, refined low-penetration ultra-high modulus mixes are generally unacceptable in these climates. Hence, there is a need for a modification to hotmix asphalt concrete mixes that would increase the resistance to permanent deformation and increase the modulus of the mix at intermediate temperatures without affecting the binder properties significantly. A further need exists for improved interfacial properties in asphalt mixtures, particularly for use in low temperature climates. It would also be desirable if these improvements could be accomplished while improving the interfacial properties of the asphalt aggregate interface, which in turn enhances the moisture resistance of the hotmix asphalt.

SUMMARY OF THE INVENTION

The present invention advantageously provides a process of producing hotmix asphalt concrete with enhanced performance. This process advantageously includes supplying a hot aggregate with a surface temperature of at least 250 deg. F. Once the hot aggregate has been provided, a primer is added to the aggregate and the two are mixed for a period of time sufficient to melt the primer onto at least a portion of the aggregate surface. The melted primer advantageously forms a primer layer over the aggregate surface. An asphalt base binder is added to and mixed with the hot aggregate at least partially covered with the primer layer. The primer layer subsequently becomes a primer interlayer between the hot aggregate and the base binder. The primer interlayer is a discreet, thin layer that is mostly primer. The primer is substantially immiscible with the base binder at operating temperatures sufficient to create the desired surface temperature of the aggregate because of the viscosity differences between the primer and the asphalt binder. The resulting hotmix asphalt concrete has enhanced performance when compared with an aggregate and base binder combination without a primer being added.

Preferred exemplary base binders include petroleum derived asphalt binder and petroleum derived asphalt binders. Those petroleum derived asphalt binders that do not contain polymeric additives can be referred to as "neat". At operating temperatures, the preferred base binders and the primer layer do not substantially mix due to the viscosity differences between the base binder and primer layer. In addition adhesion between the primer and the aggregate reduces mixing.

The primer used in this process is preferably an asphalt component and can also contain an augmenter. The augmenter is a processing agent. In a preferred embodiment, a significant component of the primer, the asphalt component is natural asphalt such as Gilsonite. Another particularly preferred primer asphalt component is Trinidad Lake Asphalt (TLA). Asphalt components such as shale asphalt, the bottoms from solvent deasphalted process, bottoms of vacuum tower bottoms, as well as, very hard asphalts, asphaltene containing hydrocarbons, blown asphalts, stiff refined asphalts, and/or fluxes can also be used as significant components of the primer. In yet another embodiment, combinations of these primers are used. In a particularly preferred embodiment, the asphalt component is used in an absence of the processing agent, or any fibers, polymeric and elastomeric additives. Primers have a softening point above about 250° F. A preferred primer is Gilsonite. The primer melts under operating conditions and forms a high viscosity layer around the aggregate.

In one embodiment, the primer and the base binder are added to the hot aggregate together such that the primer forms the primer layer. In a preferred embodiment, the primer is added to the hot aggregate prior to the addition of the base binder. The primer is advantageously melted onto at least a portion of the surface of the hot aggregate and subsequently forms the primer interlayer between the hot aggregate and the base binder.

The present invention also advantageously provides a hotmix asphalt concrete having enhanced performance resulting from the above-described process. The hotmix asphalt concrete advantageously includes aggregate, primer, and asphalt base binder. The resulting hotmix asphalt concrete has enhanced performance when compared with an aggregate and base binder combination without a primer being added. The enhanced performance includes better performance in low temperature climates.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof that is illustrated in the appended drawings, which form a part of this specification. It is to be noted, however, that the drawings illustrate only a preferred embodiment of the invention and are therefore not to be considered limiting of the invention's scope as it may admit to other equally effective embodiments.

DETAILED DESCRIPTION OF THE INVENTION

As illustrated in FIGS. 1-19 and as further described herein, the present invention advantageously provides a process to prime the aggregate during the hotmix asphalt concrete (HMAC) production prior to the base binder application, which results in a hotmix asphalt concrete with enhanced performance. In this process, the primer melts onto at least a portion of the hot aggregates and creates the primer interlayer, which has a high viscosity and is very adhesive, between the aggregate and the base binder. In a preferred embodiment, the average thickness of the primer interlayer is between 0.5 µm and 3 µm. In some applications with very high base binder contents, the primer interlayer film thickness exceeds 3 µm. This primer interlayer is generally highly polar and, therefore, has a great affinity towards the aggregate. Because of its organic, hydrocarbonous nature, the primer interlayer also has a great affinity towards organic and particularly petroleum-based products or asphalt base binders. In a preferred embodiment, the primer interlayer includes Gilsonite. It has been observed from a classic "can" test that once added, Gilsonite (a natural asphalt) sticks to the surface of the can and even high shear and high temperature will not dislodge Gilsonite from the can's surface.

Figure 5:
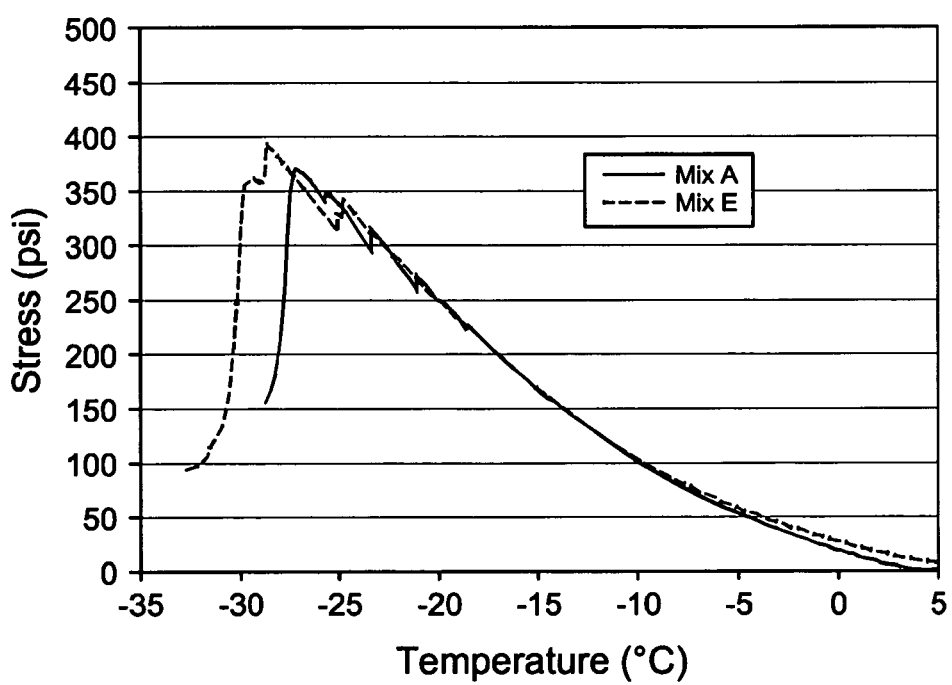
FIG. 5 is a graph illustrating a Thermal Stress Curve of a hotmix asphalt concrete mix made in accordance with an embodiment of the present invention and an asphalt concrete mix made in accordance with prior art method, Thermal Stress Restrained Specimen Test (TSRST)

Advantageously, in various embodiments of this process, the failure temperature of the asphalt concrete mix of the invention remains unaffected, as compared to the hot mix without primer, because the base binder does not substantially commingle with the primer and, therefore, retains its excellent low temperature properties. The low temperature properties of the base binder are in particular the temperature at which the hot mix asphalt fails, i.e., where it cracks when the pavement temperature drops. Since the aggregate strength is orders of magnitude higher than the strength of the base binder, low temperature cracking is typically observed in the base binder phase. Stiff base binders are brittle at low temperatures and crack earlier than soft and ductile base binders. As illustrated in FIG. 5, adding hard primers such as Gilsonite to the base binder result in base binders that fail first at very high temperature thus sacrificing failure temperature for improved rut resistance. Advantageously, treating the aggregate with the primer does not harden the base binder and, thus the actual base binder's low temperature properties are not compromised by the very stiff primer system.

In a preferred embodiment, a significant component of the primer is natural asphalt such as Gilsonite, which can have a very high percentage of basic nitrogen and, therefore, is very surface-active. One of the particular properties of Gilsonite is its high viscosity (generally orders of magnitude higher than conventional asphalts) and high Ring- and Ball Softening Point. Shale asphalt, the bottoms from solvent deasphalted process, bottoms of vacuum tower bottoms, as well as, very hard asphalts, asphaltene containing hydrocarbons, blown asphalts, stiff refined asphalts, and/or fluxes can also be used as significant components of the primer for creating the high viscosity interlayer. Similarly, combinations of the same can be used. The ultra high viscosity/high viscosity primer is preferred and can be augmented with processing agents. The processing agents are added to enhance the workability of the primer, or wetability, and facilitate the rapid melting of the asphalt primer onto at least a portion of the aggregate surface. However, in one embodiment, the hotmix asphalt concrete of the invention has an absence of additives, such as processing agents. This provides a low costs asphalt concrete mix while maintaining superior properties.

The base binder which makes up the matrix in the filled voids between the primed aggregate surfaces can be any asphalt, polymer or chemically modified asphalt. The composition of the base binder has in particular an impact on the ductile properties of the hot mix asphalt. The process of the invention enhances the interfacial and total mix properties rather than the actual properties of the base binder matrix. However, less expensive asphalts can be used as well. While any asphalt, polymer or chemically modified asphalt is useful as the base binder in the current invention, preferred base binders include neat petroleum derived asphalt binder and petroleum derived asphalt with polymers.

The primer, which can contain any or a combination of the before-mentioned components, is preferably added at a level of 3% to 10% by weight of total binder. The total binder is the combination of the primer and the base binder. However, when a high percentage of fines and/or mineral fillers are added to the aggregate, higher percentages of primer (in excess of 10%) are used to achieve desired aggregate surface coverage. The process is not limited to hotmix asphalt concrete applications, but can also be used whenever the base binder needs to be mixed with an aggregate. Examples of other applications that can utilize the process described herein include roofing chips and chips for chip seal applications.

Depending on the viscosity, melting point, and glass transition temperature of the primer or its components, the aggregate surface temperature is preferably in excess of ° F. In specific cases, however, temperatures as low as 250° F. can be utilized with certain base binder systems. Once the primer has melted and covered at least a portion of the aggregate surface, the base binder is added and forms a distinct layer. Alternately, the temperature can be maintained such that the primer, in the presence of the base binder, melts and adheres to a portion of the aggregate before the base binder is available for adhesion. In a hotmix plant, melting and covering at least a portion of the aggregate with the primer can be rapidly achieved in about three to ten seconds, and the base binder is applied according to standard industry practice. Advantageously, the amount of base binder can be reduced by the amount of primer added so that the amount of voids filled with total binder is not changed, i.e. remains constant. Gilsonite forms a very thin layer on the aggregate during the time that the mix resides in the hot mix plant after adding the binder. It does not appreciatively intermingle with the base asphalt. The Gilsonite is also extremely high on nitrogen-compounds which are polar and, it therefore, adheres preferentially to the aggregate surface.

The resulting asphalt concrete mixes exhibit significantly enhanced dynamic moduli at intermediate temperatures that, in a stress-controlled environment, results in reduced pavement strains, and, consequently, enhanced fatigue life. Thus, the use of the primer of the invention can result in significant material savings by requiring thinner hotmix asphalt layers, i.e., base binder courses to achieve equivalent fatigue life expectancies.

The resulting mixes also exhibit significantly enhanced rut and shoving resistance. The improvement or inverse rut rate can be in excess of 500%. In regards to moisture damage, the hotmix asphalt concrete of the invention with additives appear to provide equal or better moisture resistance than mixtures treated with 1% to 2% hydrated lime as measured in the Hamburg Wheel Tracker. Additives can work on all commonly used aggregate types. Because of the nature of the processing agent, the total binder content with primer in the mix is generally not affected, as measured in the SHRP gyratory compactor (AASHTO T312-03).

In a preferred embodiment, Gilsonite, is used as a primer with a very high nitrogen, low sulfur, high molecular weight, high asphaltene content, high melting point asphalt that has excellent absorptive properties. The aggregate is "primed" with the Gilsonite compound, which creates a layer on the aggregate. This asphalt phase is very hard and does not dissolve, mix or melt into the base binder once the base binder is sprayed or applied onto the aggregate. The primer asphalt forms a strong interlayer primer between base binder and the aggregate. In the case of Gilsonite or shale asphalt the high polarity of the polynuclear aromatic nitrogen compounds prevents water from breaching the interface between the asphalt and the aggregate. Because it is very hard, the pump action of the water is insufficient to separate it from the aggregate. At the same time, it has a great affinity towards the asphalt base binder and is easily coated by the base binder. Thus, the enhanced mix creates a system that eliminates the need for adding lime, exhibits significantly lower deflections under loading, and is much more shear resistant at elevated temperatures at reduced pavement thickness.

The process described herein can also be used in other applications where the aggregate needs to be added to the base binder besides the formation of asphalt concrete. Examples include use in roofing chips and chips for chip seal applications. Other applications that can utilize the process described herein will be apparent to those of ordinary skill in the art of asphalt processes and are to be considered within the scope of the present invention.

The primer has a softening point of at least about 250° F. In a preferred embodiment, the primer of the invention is preferably an asphalt with a softening point of 280° F. or greater, thus, it is solid at room temperature. The materials useful as the base binder have lower softening points.

As an embodiment of the present invention, the process of producing asphalt concrete with enhanced performance utilizing the primer includes supplying the hot aggregate with surface temperature of at least 250 deg. F. In another preferred embodiment, the surface temperature is at least 340 deg. F. In a particularly preferred embodiment, the surface temperature is at least 380 deg. F. Enhanced performance achieved by this invention includes enhanced fatigue life, enhanced rut and shoving resistance, and/or better retaining of low temperature properties of the base binder.

The primer used in the invention is preferably selected from the group consisting of an asphalt component, a processing agent, additives, and combinations thereof. Representative examples of asphalt components include a natural asphalt (e.g., Gilsonite), a shale asphalt, bottoms from a solvent deasphalting process, a hard asphalt, a blown asphalt, a stiff refined asphalt, a flux, and combinations thereof. Representative examples of processing agents include an oligiomeric wax, a derivative of an oligiomeric wax (e.g., a carboxylated derivative of the oligiomeric wax.) The processing agent enhances workability, for example, compactibility. The processing agent is used in those manners that are typical within the art.

The primer used in this process can further comprise pelletized Trinidad Lake Asphalt (TLA) to enhance stiffness of the asphalt concrete, and a processing agent. The Trinidad Lake Asphalt is being advantageously added in a four-to-one to twenty-to-one ratio to the processing agent.

Still preferably, the primer is between about 3% to about 10% by weight of the total binder when added to the aggregate. In a preferred embodiment, the aggregate includes recycled asphalt pavement. The primer is advantageously added to the aggregate in various ways known. Addition can be made through the use of a bulk silo, a supersack, a meltable bag, or an auger. The addition of the primer preferably occurs in a time period of about 3 seconds to about 10 seconds prior to the step of adding the base binder. The time period is selected to enable sufficient time to allow the primer to at least partially adhere onto the surface of the aggregate.

The present invention is further directed to asphalt concrete produced by the method described above. The hot mix asphalt concrete of the invention includes aggregate at least partially covered with the primer interlayer, substantially surrounded by base binder, and having enhanced performance.

The following examples are given for the purpose of illustrating various embodiments of the invention and are not meant to limit the present invention in any fashion.

EXAMPLE 1

Components

The present invention provides primer for aggregate used primarily, but not only, in hotmix asphalt concrete (HMAC) applications. The primer is made up of various components. The first component is the primer which is an asphalt carrier, preferably a natural asphalt (e.g., Gilsonite), a shale asphalt, bottoms from a solvent deasphalting process, a blown asphalt or a very stiff refined asphalt. This component is preferably combined with a processing agent to improve workability, depress the apparent melting point, and improve aggregate coverage. In addition, ground tire rubber can be used to provide superior visco-elastic properties to the primer interlayer. In high performance applications, pelletized Trinidad Lake Asphalt (TLA) can also be combined to further enhance the mix stiffness by creating a three dimensional TLA network in the hotmix asphalt concrete.

Preferably, the various components are dry-blended, however, they can also be melt-blended, extruded, or the asphaltic component can be added during the polymer finishing step so that it is encapsulated in the polymer or processing agent's crumb/pellet.

EXAMPLE 2

Process

The primer is preferably applied to the hot aggregate before adding the asphalt base binder. Depending on the hotmix asphalt plant type, the primer system can be applied via a bulk silo, supersacks or meltable bags onto at least a portion of the hot aggregate. In continuous drum plants loose material is preferably augered or fed via a feed belt onto the hot aggregate. The entry point is away from the flame to ensure that the material is not burned. When it is applied as a powder, it is preferred to avoid feeding the primer through the air stream onto the hot asphalt since it can be carried out into the burner and can potentially present a safety issue. The preferred entry point in a counter-flow, continuous, single drum plant is on the downhill side of the recycled asphalt pavement (RAP) collar. In a double drum plant, it can be fed onto the outside drum in order to avoid exposure of the primer to the flame. In batch plants, it is preferably added via meltable bags into the pug mill. The contact time to ensure proper coating and melting of the primer is preferably 3 to 10 seconds before the base binder is applied.

EXAMPLE 3

Performance Characteristics of Resulting Composition

Moisture Resistance: The moisture susceptibility of two mixes, mix A and mix E, were evaluated in the Hamburg Wheel Tracking (HWT) with the samples submerged in water. Mix A has the same base binder and mix design as in the case of mix E. In mix E, however, the aggregate had been primed with a blend of Gilsonite, a waxy oligiomeric processing agent and a Gilsonite-extended styrene butadiene copolymer. The HWT is a torture test that was developed in Germany and has been found to characterize the stripping susceptibility of a mix, i.e. moisture damage. A number of State Departments of Transportation, such as Utah and Texas, have recently adopted the test for acceptance testing.

The HWT was modified in the present study to accept Superpave gyratory compacted samples, rather than compacted pavement slabs. The testing was carried out at 50° C. at a rate of 52 passes per minute. The target air void level of the specimens for the HWT was 6%-7%. Generally, it is considered a failure if the rutting exceeds 10 mm after 20,000 cycles. A more sophisticated analytical approach is to separate the shear induced permanent deformation from the moisture induced "rutting". As the wheel travels across the cores it "pumps" water into the mix, which can weaken the base binder. If the adhesive bond between the base binder and the aggregate fails water can penetrate in between and the mix will exhibit large-scale stripping. Generally when this occurs the fines are washed out and the water has a tendency to become turbid. Consequently, the rut curves can be subdivided into three distinct regions: (i) an initial post-compaction phase, which occurs during approximately the initial 1,000 passes; (ii) a secondary range where conventional rutting occurs; and (iii) if moisture damage occurs a tertiary "catastrophic" stripping range. The slope in the tertiary range, i.e., the apparent "rut" rate, accelerates and is a direct performance measure for a system's stripping resistance. This is shown for mixes A and E in FIG. 1.

In Mix A (unmodified mix) the critical rut depth of 10 mm was reached after 17,310 cycles and the rut rate in the stripping range was only 0.00075 mm/cycle. Mix E exhibited no stripping problems. The mix accumulated only 2.7 mm rutting after 20,000 cycles and had approximately 10 times lower rut rate in their tertiary phase than in the non-pretreated mix using the same asphalt. The specimens shown in FIG. 2 and FIG. 3 clearly demonstrate the significant improvement that the primer provides in mitigating moisture damage. In the case of conventional mix A, the water that the samples were submerged in turned turbid at the end of the HWT experiment, i.e., fines were being washed out. This did not occur in mix E.

Resistance to Permanent Deformation: The rut resistance of the mixes was evaluated using a Hamburg-type wheel tracker (HWT manufactured by Precision Machine Works) without submerging the specimens in water. The reason for using the Hamburg wheel tracker rather than the Asphalt Pavement Analyzer (APA) was that prior experiments indicated that it had a much higher shear component than the other previously mentioned torture tests. Thus, Hamburg wheel tracker was considered to be a more realistic simulation of the actual field conditions.

Because of the excellent angularity of the aggregate and the very high temperature values of the dynamic shear rheometer (DSR) stiffness of the base binder, the rut testing was carried out at 76° C. A loading rate of 40 passes/minute was selected to increase the severity of the test. To rank the rut resistance of the mixes either the total accumulated deformation after 20,000 passes or the slope in the linear range is commonly used. The latter is more reliable and a better measure for actual rutting because it eliminates the variability in the initial post-compaction phase. The rut rates in the linear range of the "Dry" HWT are shown in Table 1, which illustrates comparison of the high and low temperature performance of mixes containing a PG70-28 base binder modified with 10% Gilsonite by weight of base binder and the same mix with the same base binder where the aggregate had been primed with 0.5% by weight of mix of a Gilsonite/processing agent/elastomer.

TABLE 1

| Mix Identification | Base binder | Primer | Rut Rate in the HWT-dry at 76° C. (mm/1000 cycles) | TSRST failure temperature (° C.) |
|---|---|---|---|---|
| Mix A | PG70-28 | No | 0.58 | −33.2 |
| Mix C | PG70-28 modified with 10% Gilsonite | No | 0.14 | −27.9 |
| Mix E | PG70-28 | 0.5% by weight of total mix | 0.12 | −33.2 |

Figure 1:
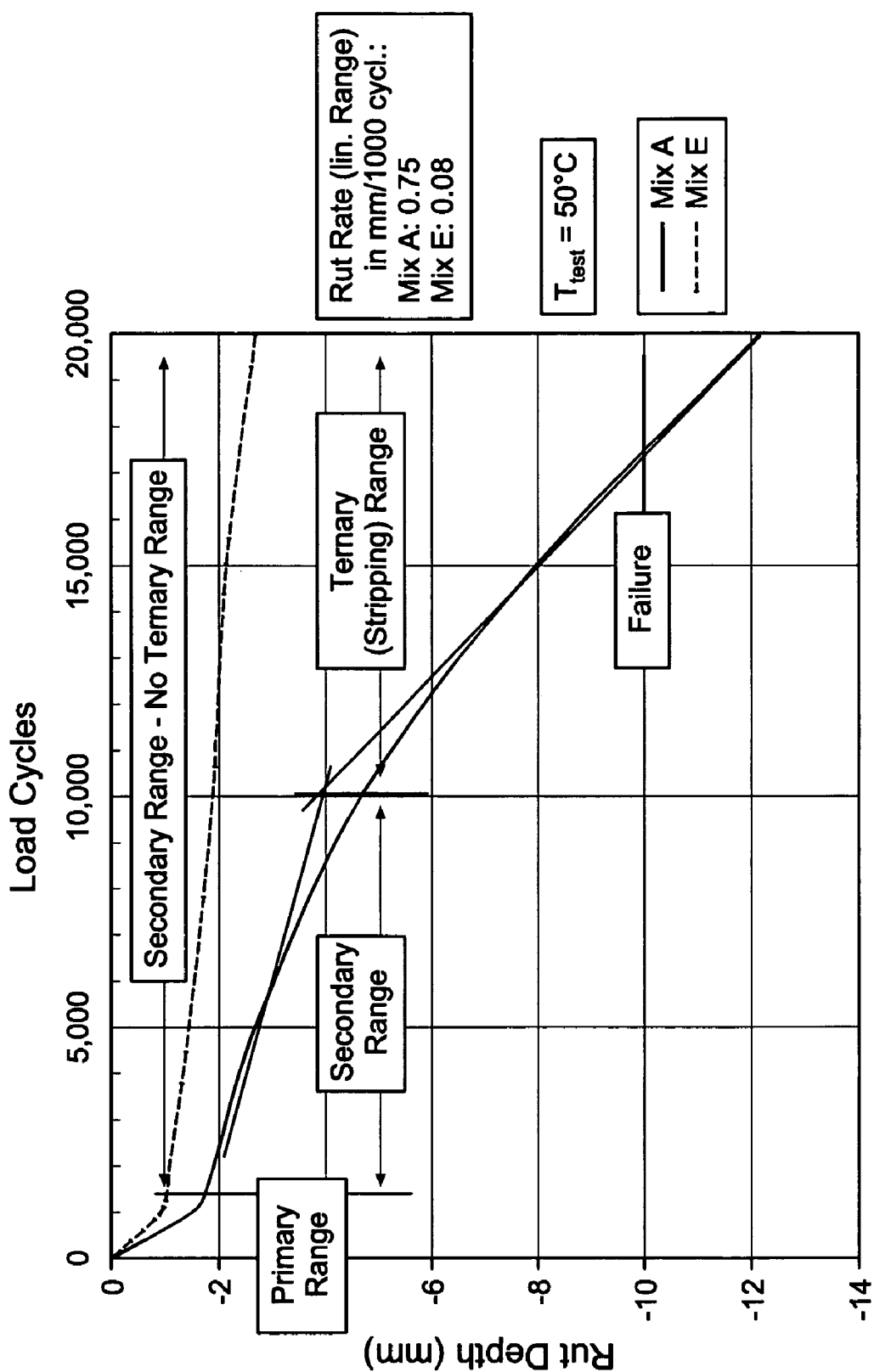
FIG. 1 is a graph comparing the Hamburg Wheel Tracking (HWT) results for the hotmix asphalt concrete mix using the process of the current invention compared to prior art asphalt concrete mix without a primer.
Figure 2:
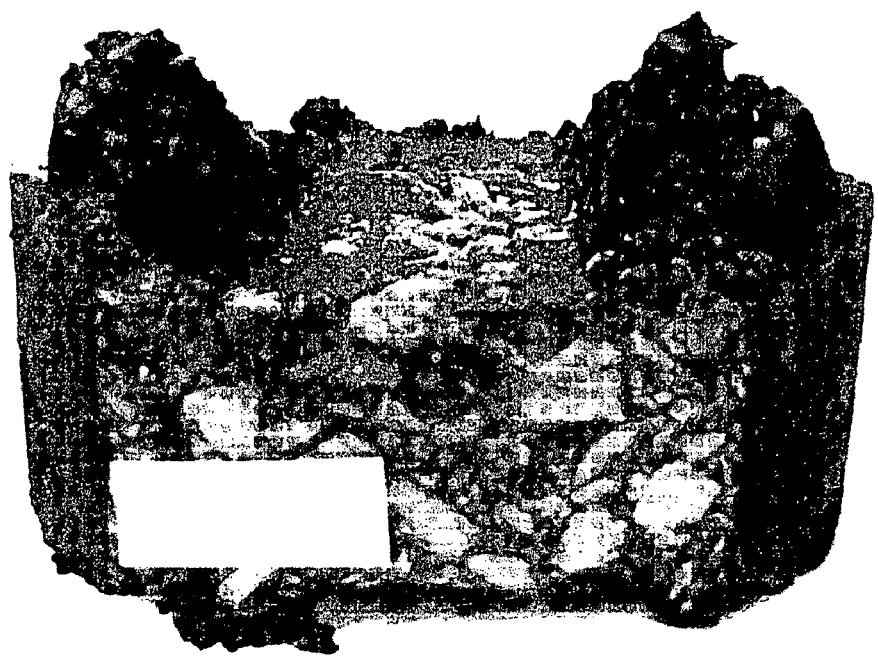
FIG. 2 is a perspective view of an asphalt concrete mix in accordance with a prior art embodiment after 20,000 cycles in the HWT; Mix A is the curve with the high slope which accumulates over 12 mm rut depth during the test. It is the same mix with one important difference as that it does not have a primer. This test is used to demonstrate the resistance of a mix to moisture (stripping) damage. The primed mix with the same asphalt binder and same mix design ruts only 2½ mm in the same test.
Figure 3:
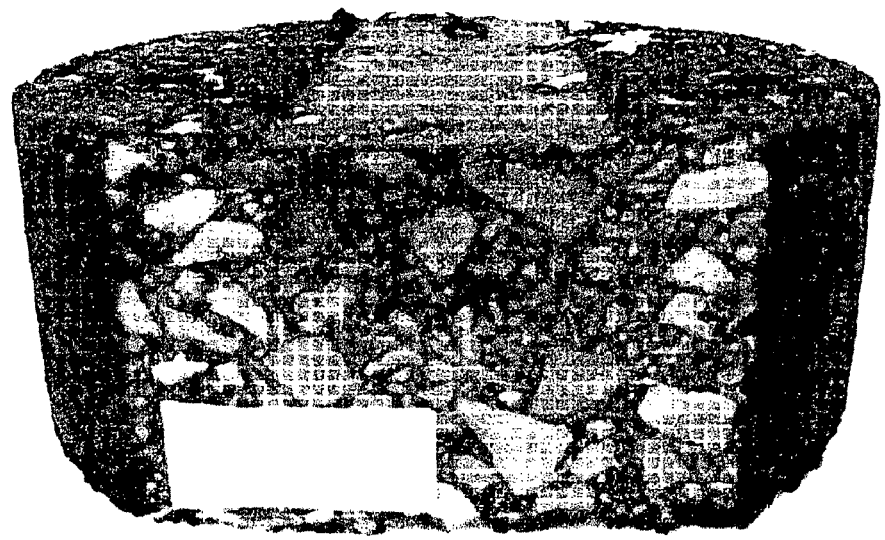
FIG. 3 is a perspective view of an asphalt concrete mix in accordance with an embodiment of the present invention after 20,000 cycles in the HWT.
Figure 4:
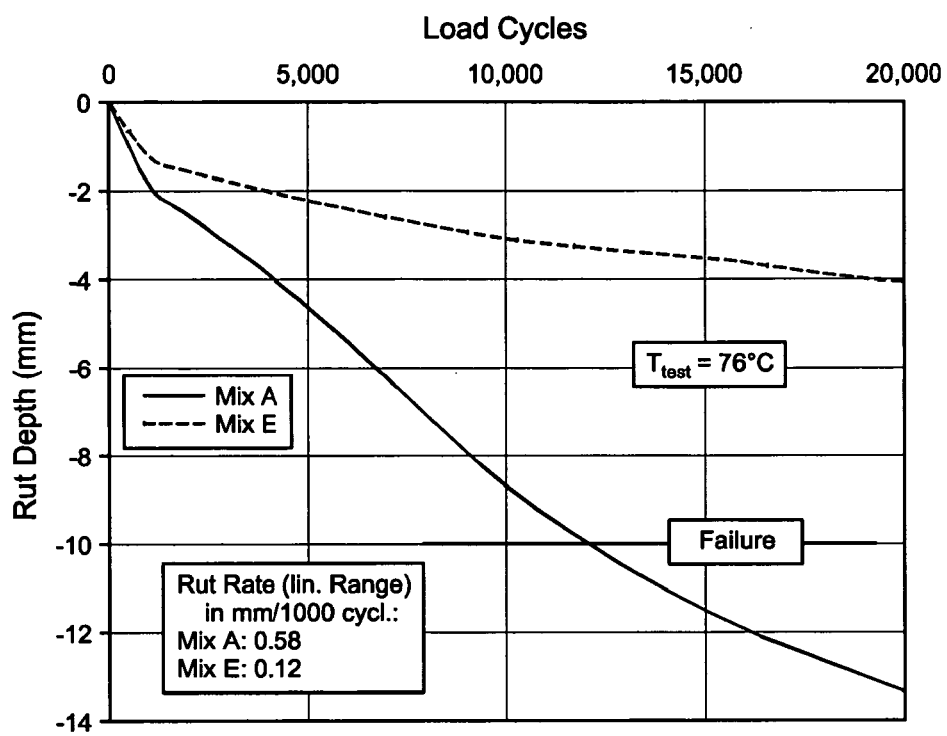
FIG. 4 is a graph illustrating Rut Curves at 76° C. of a hotmix asphalt concrete mix made in accordance with an embodiment of the present invention and an asphalt concrete mix made in accordance with prior art methods, Hamburg Wheel Tracker dry method at 76° C.

The asphalt (PG70-28) is polymer-modified. The rut resistance of mix A (conventional, non-treated mix) and mix E (primed aggregate mix) are shown in FIG. 4. The slopes in the linear range, i.e., rut rate, are summarized for all mixes in Table 1. The results indicate that addition of the mix modifier reduces the actual rut rate by nearly a factor 5, from 0.58 mm/1,000 cycles to 0.12 mm/1,000 cycles.

EXAMPLE 4

Fatigue Resistance of Resulting Composition

Fatigue measurements were carried out on field samples using the Asphalt Pavement Analyzer (APA) as a torture test at 20° C. in this example. The data indicated that the mix containing 2% lime failed after roughly 4,900 passes, but the Gilsonite/processing agent/elastomer primed mix only failed after roughly 26,700 cycles. While the APA fatigue test is a torture test, it does provide a relative performance measure. Thus, at equivalent stress levels, i.e., in a stress-controlled experiment, one can expect the primed aggregate mixes to clearly outperform the conventional mix.

Low Temperature Performance: Because the primer primes the aggregate and do not blend into the base binder, the effect of the hard visco-elastic asphalt-component on the base binder asphalt is negligible. This has been validated on previous mixes as shown in Table 1 using Tensile Strength Restrained Specimen Test (TSRST) as understood by those of skill in the art. This test evaluates how a temperature drop induces stress into (dT/dt=2° C./hr) the restrained pavement.

At low temperatures, the stresses cannot be relaxed and eventually the stress exceeds the mix strength and fails, as shown in FIG. 5. This mode of failure is called single-event thermal cracking and manifests itself in transverse cracks across the pavement. Because the base binder properties are unaffected by the primer, the base binder PG64-34 retains its excellent low temperature performance, i.e., flexibility. PG64-34 is not one of the base binders shown on Table 1. This is shown in Table 1 where there is no effect of the primer on the mix's low temperature performance. Mixing the equivalent amount of Gilsonite in the base binder modifies the low temperature failure temperature from roughly −33° C. to −28° C. and embrittles the base binder. Table 1 shows sample 1 provides less satisfactory rutting characteristics, sample 2 fails due to raising of failure temperature, sample 3 provides positive results.

Compactibility and Workability: Frequently natural asphalt additives can increase the base binder modulus so much that at compaction temperatures, it is either difficult to reach air voids in the field or the design asphalt cement (AC) content must be significantly increased in order to meet a 4% design air voids content in the SuperPave gyratory compactor.

Figure 6:
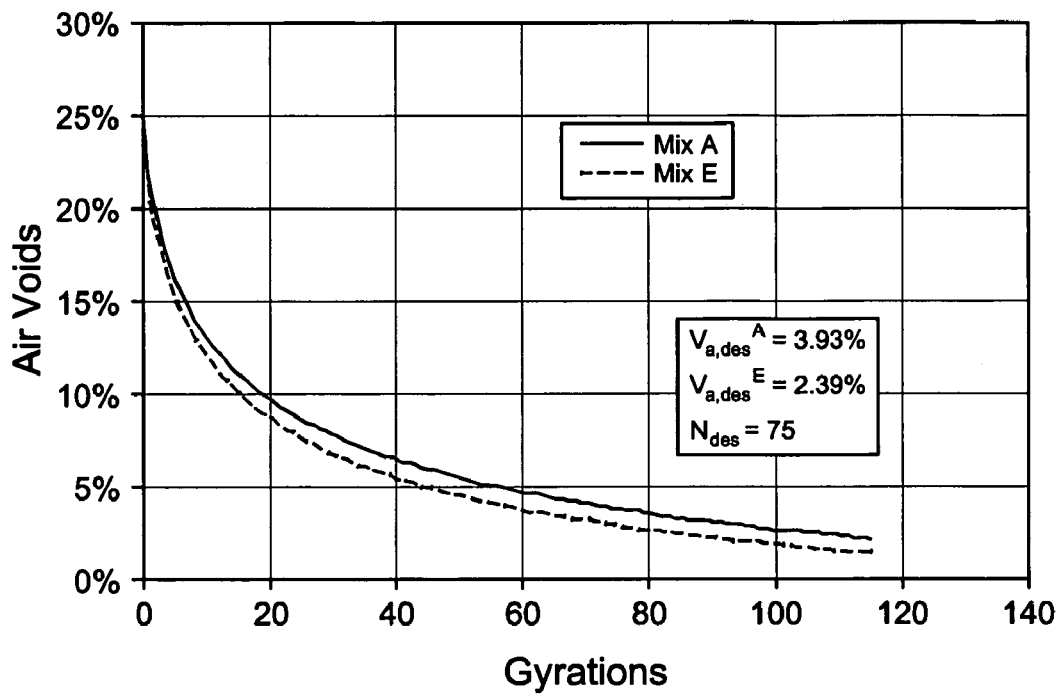
FIG. 6 is a graph illustrating a Compaction Curve of a hotmix asphalt concrete mix made in accordance with an embodiment of the present invention and an asphalt concrete mix made in accordance with prior art method, SHRP Gyratory Compaction Method.

When the AC content is increased the general result of this is that the dynamic modulus of the mix decreases because the base binder is always much softer in orders of magnitudes than the aggregate. In order to overcome this issue, the primer preferably contains a processing agent (PA) that results in reduced or a constant AC content. FIG. 6 shows the results of the compaction curves for one typical unmodified conventional mix (mix A) and a primed mix (mix E).

Figure 7:
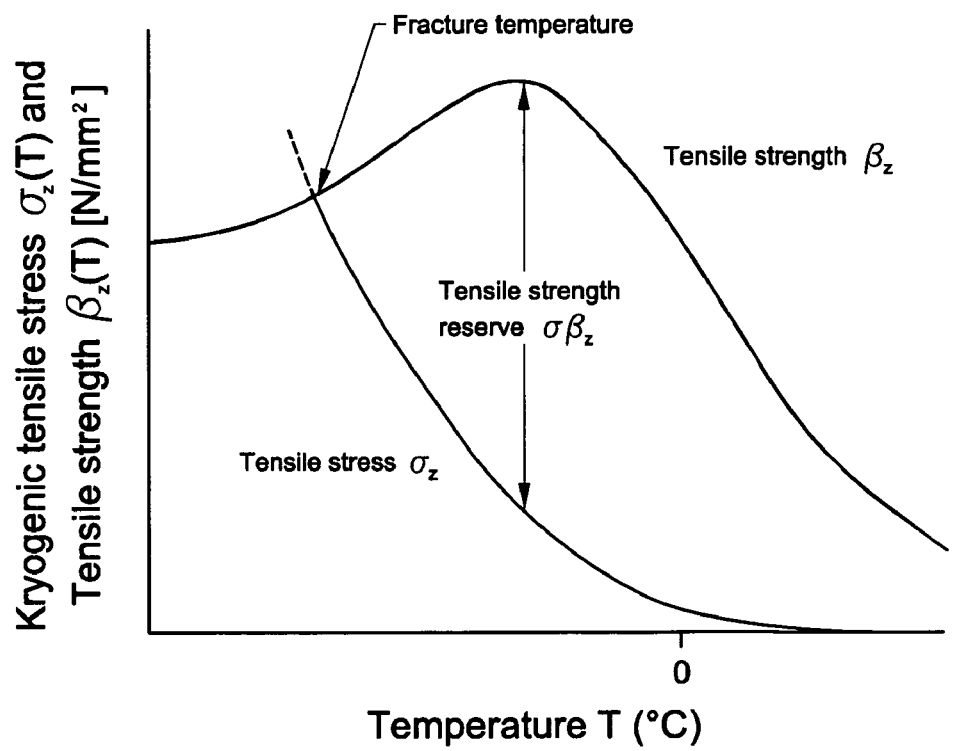
FIG. 7 is a graph illustrating a Schematic of Tensile Strength Reserve in accordance with an embodiment of the present invention.

Tensile Strength Reserve: The effect of the primer on load-induced stresses in the pavement at low temperatures was evaluated. As shown in FIG. 7, the tensile strength reserve is the difference between the tensile strength and the temperature induced thermal stress. The smaller the difference, the more likely the pavement is to fail under traffic loading in single event load induced thermal cracking rather than via the traditional fatigue failure. Because the load is superimposed on top of the already existing thermal stresses, it is logical to expect that the temperature at which this phenomena occurs can be at substantially higher temperatures than the critical cracking temperature of a non-loaded specimen (i.e., the BBR failure temperature).

Figure 8:
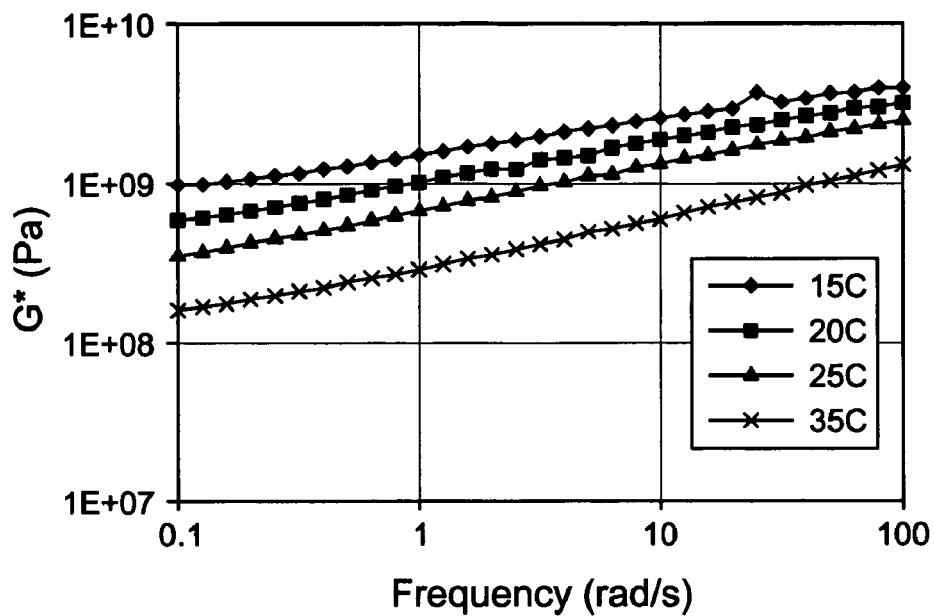
FIG. 8 is a graph illustrating individual frequency sweeps of primed aggregate mix in accordance with an embodiment of the present invention.

The following description outlines the modeling that was used to approximate the tensile strength reserve for the 4" conventional PG64-34 pavement and the primed-aggregate system of the invention utilizing PG64-34. In order to estimate the stresses and strains in the pavement as a function of the air temperature, the temperature dependency of the flexural moduli is taken into consideration. This was accomplished by performing rectangular torsion testing on mix slivers at 15°, 20°, 25° and 35° C. respectively. The testing was carried out at frequencies ranging between 0.1 rad/sec and 100 rad/sec as shown in FIG. 8). Subsequently, time temperature superposition was used to calculate the shift factors and to create a master curve, which enables us to predict the modulus at 10 Hz, which is commonly assumed to model traffic loading over a relatively wide range. In this procedure, a reference temperature, $T_{ref}$, was chosen and the frequency at any temperature T multiplied by a shift factor, $a_T$, to obtain a reduced frequency, $\omega$. In all cases shown here $T_{ref}$ was equal to 15° C. The reduced frequency $\bar{\omega}$ is obtained using the following equation:

$$\bar{\omega} = \omega \cdot a_T$$

Figure 9:
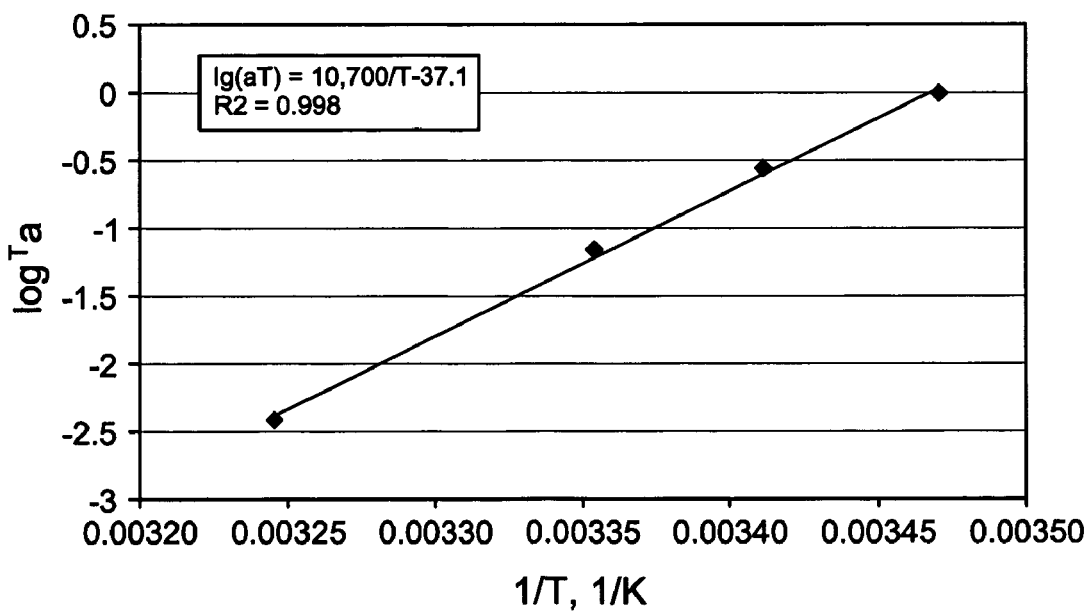
FIG. 9 is a graph illustrating a shift factor versus inverse absolute temperature for a primed aggregate mix made in accordance with an embodiment of the present invention.

As shown in FIG. 9, over a wide temperature range, a linear relationship exists between the shift factor and the inverse absolute temperature in K as shown in the following equation:

$$\log a_T = c_1 + c_2/T$$

Figure 10:
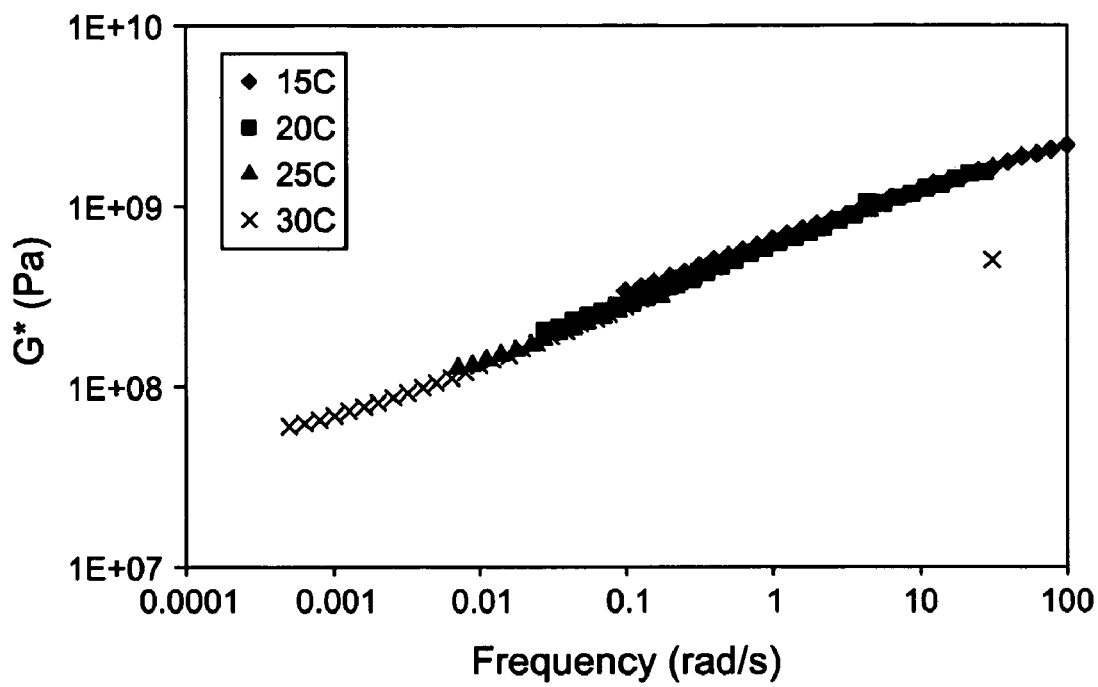
FIG. 10 is a graph illustrating a master curve of the base binder containing RAP at a reference temperature of 15° C. made in accordance with prior art methods.
Figure 11:
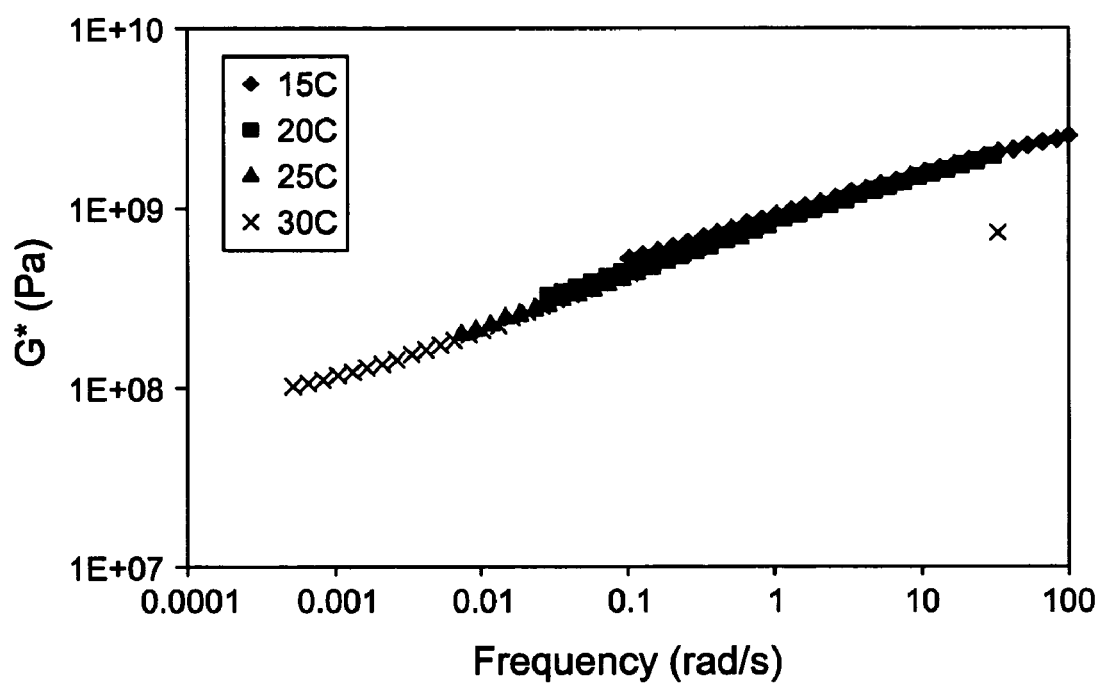
FIG. 11 is a graph illustrating a master curve of a primed aggregate concrete mix at a reference temperature of 15° C. made in accordance with an embodiment of the present invention.
Figure 12:
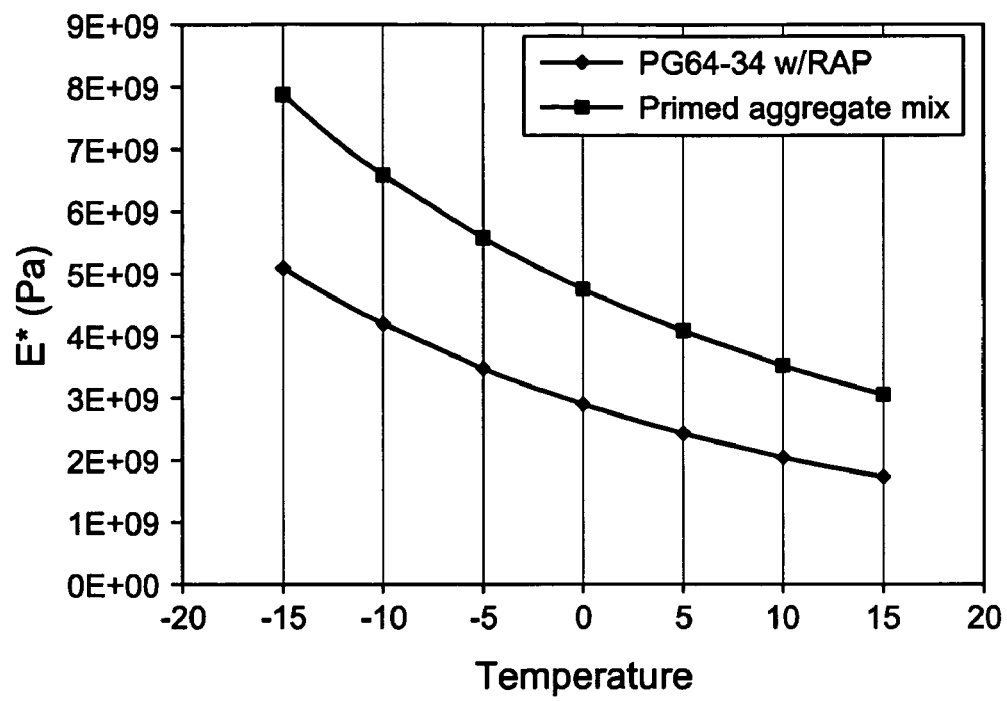
FIG. 12 is a graph comparing a flexural modulus as a function of the temperature at 10 Hz for a primed aggregate concrete mix made in accordance with an embodiment of the present invention and an aggregate concrete mix made in accordance with prior art methods.

This relationship works well for the example mixes and has been used to create the master curves shown in FIGS. 10-11. With this data the dynamic modulus can be predicted as a function of the temperature, as shown in FIG. 12, by converting the reduced frequency, $\bar{\omega}$, into the temperature domain using a reference frequency of 10 Hz, as shown in the following equation:

$$T(\bar{\omega}) = \frac{c_2}{\left(lg\left(\frac{\bar{\omega}}{10_{Hz}}\right) - c_1\right)}$$

The modulus is then determined utilizing the following equation:

$$G^*(T)\omega_{ref=10\ Hz} = G_{(\bar{\omega})Tref=15°\ C.}$$

The next step was to determine the temperature depth profiles in the pavement assuming an average annual temperature of 8.9° C., which is similar to one typical location. Assuming a hyperbolic temperature depth profile, one can estimate the temperature at any given depth and then average this over the lift to obtain an average modulus for any given location. The stresses are highest at the 1" location.

Figure 13:
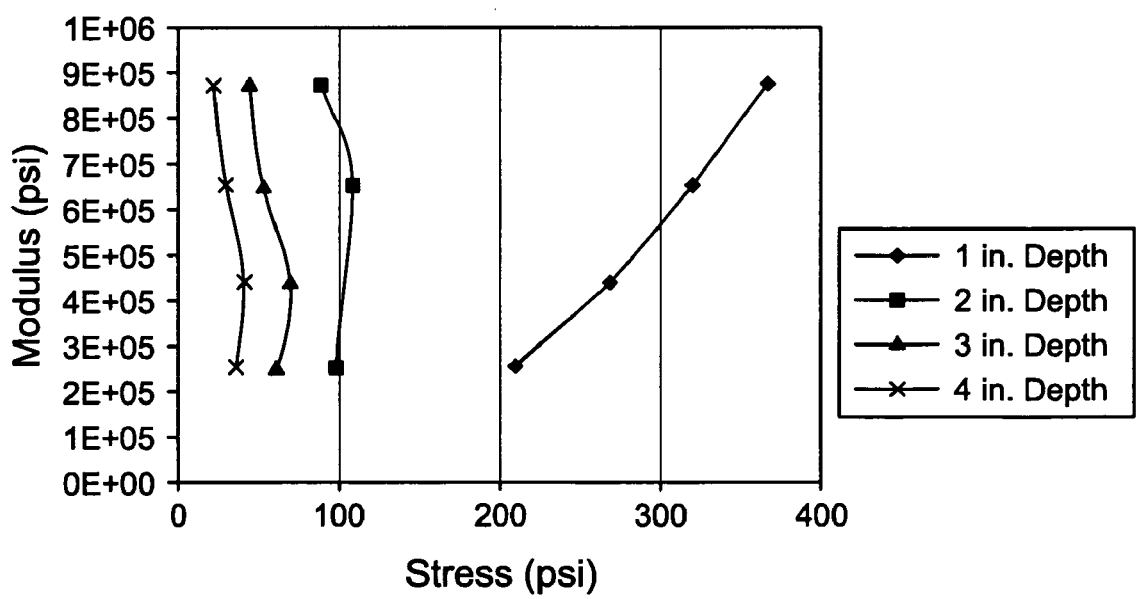
FIG. 13 is a graph illustrating stress at various depths for a 3" lift as a function of an asphalt concrete mix stiffness in accordance with an embodiment of the present invention.

At deeper locations in the pavement, the stress level is less modulus dependent. A closer view shows that the stresses at deeper locations slightly decrease with increasing modulus as shown in FIG. 13.

Figure 14:
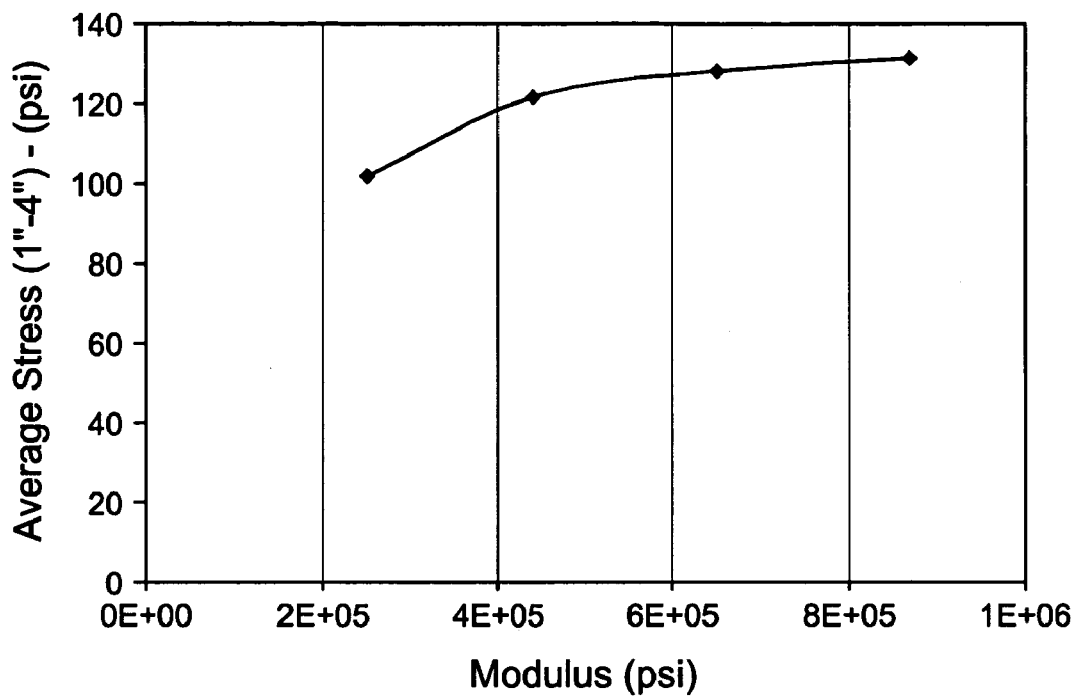
FIG. 14 is a graph illustrating an average stress as a function of an asphalt concrete mix modulus for a 3" thick lift in accordance with an embodiment of the present invention.
Figure 15:
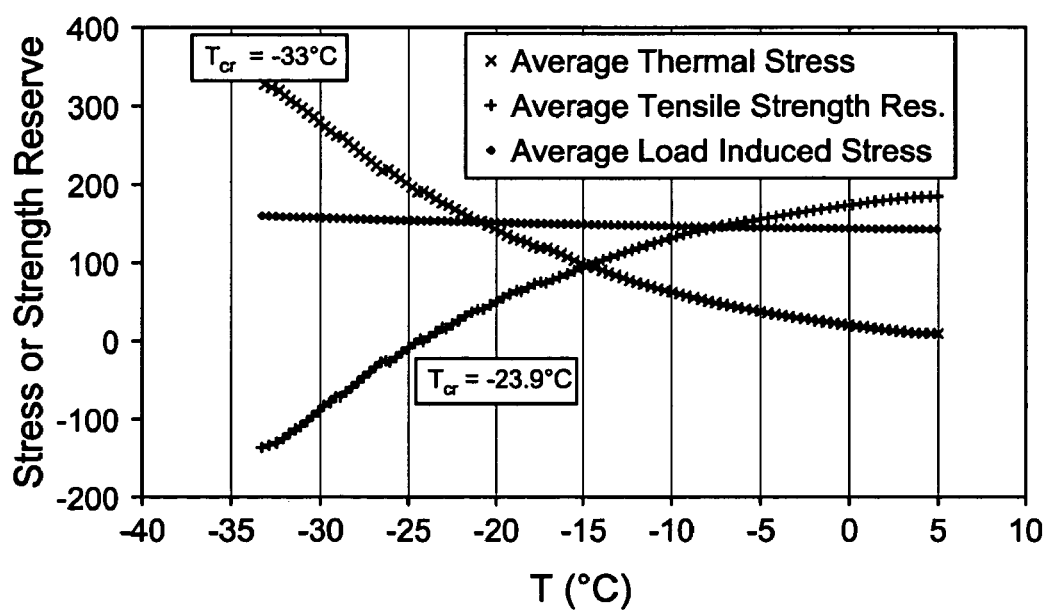
FIG. 15 is a graph illustrating tensile strength reserve and thermal stress curves for an asphalt concrete mix made in accordance with prior art methods.
Figure 16:
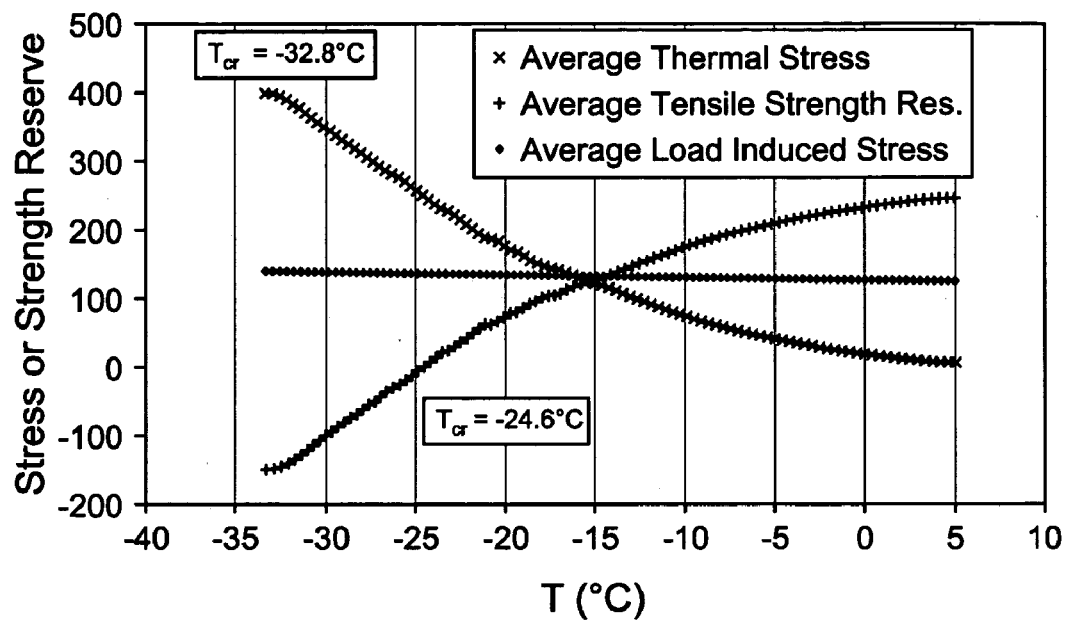
FIG. 16 is a graph illustrating tensile strength reserve and thermal stress curves for a hotmix asphalt concrete mix made in accordance with an embodiment of the present invention.

In the present example, the average stress was approximated between 1" depth and 4" depth since this was most likely to be where stress-induced thermal cracking would occur. In the upper lift, the localized stresses can be very high and the results of the analysis need to be carefully considered. The stresses have been averaged for four data points, such as at 1", 2", 3" and 4" depths, rather than numerically integrated over the entire cross-section. The average lift stress is shown in FIG. 14. The data clearly indicates that, for a mix modulus of more than 500,000 psi, the average stress levels at a given lift thickness do not vary significantly.

Using this information, it is now possible to compute the load-induced stresses as a function of temperature. These load-induced stresses are then added to the thermal stresses. The tensile strength reserve, $\sigma\beta_Z$, is then at any temperature the difference between the strength of the mix and the combined stresses. If the combined stresses exceed the strength, then the mix should crack. This is shown for a PG64-34 and the corresponding primed aggregate mixes in FIG. 15 and FIG. 16. The primer significantly enhances the mix strength (401 psi vs. 329 psi, respectively). Assuming that the tensile strength does not change significantly between −15° C. and −30° C., both mixes fail at virtually the same temperature (∼−24° C.).

EXAMPLE 5

Ultra-High Modulus Mixes

In Europe ultra-high modulus base binders have been widely marketed. Examples of such ultra-high modulus base binders include blown asphalts, Gilsonite-modified asphalts, the bottoms of solvent-deasphalted VTB. These materials are preferably produced by one of the three following approaches: (i) blowing of asphalt fluxes, (ii) deep refinery cuts; and (iii) chemical treatment of the base binder with polyphosphoric acid. In limited experimental quantities, the materials have also been produced by adding Gilsonite to the base binder. Invariably in all these approaches the low temperature properties as measured in the bending beam rheometer (BBR, AASHTO TP5) are negatively impacted, i.e., while the high temperature dynamic shear rheometer (DSR) values and the intermediate DSR values are increased the low temperature failure temperature also increases. This means the low temperature performance is impaired.

In the present example, through the use of priming the aggregate, ultra-high modulus mixes can be achieved without adversely affecting the low temperature properties. Table 1 shows how adding Gilsonite to the base binder can improve the high temperature rut resistance. Table 1 doesn't show ultra high modulus mixes. The addition of Gilsonite, however, degrades the low temperature properties. Conversely, the primed aggregate mix of the present invention exhibits equivalent high temperature performance without sacrificing the low temperature properties.

EXAMPLE 6

Application with Trinidad Lake Asphalt (TLA)

Figure 19:
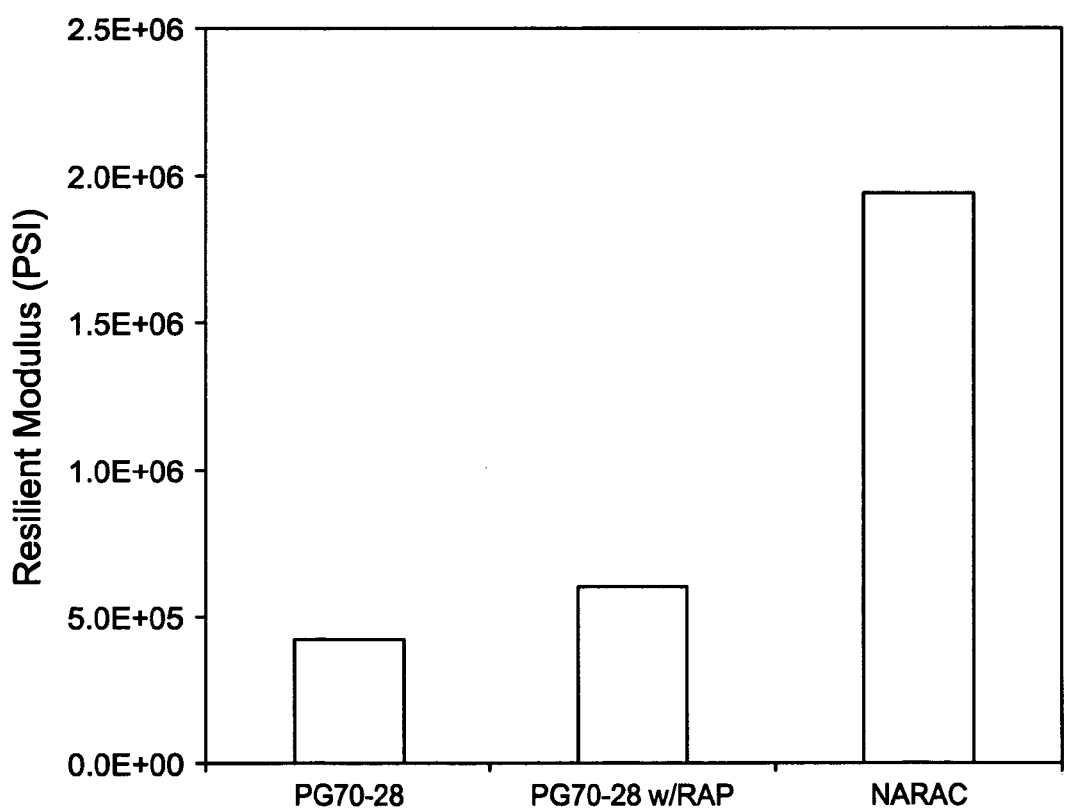
FIG. 19 is a graph comparing resilient modulus for an asphalt concrete mix made in accordance with an embodiment of the present invention with two asphalt concrete mixes made in accordance with prior art methods.

Near concrete-like stiffness can be achieved by combining TLA, modified with a processing agent, with the primer system. As shown in FIG. 19, the resilient modulus can increase from roughly 600,000 psi to 1.9 E6 psi. The processing agent can be an oligiomeric wax, a derivative of an oligiomeric wax (such as its carboxylated derivative), and/or low molecular weight polyolefins. This processing agent enhances the workability, increases the compatibility, and speeds up the mixing of the TLA into the base asphalt, as well as, promoting its compactibility. Contrary to standard industry practice, the TLA concentration ranges between 2% and 15% by weight of total binder. The primer concentration preferably varies between 2% and 15% depending on the aggregate degradation and surface area. The primer is added in the same manner as described in earlier examples.

Alternatively the TLA can be preblended with the processing agent and pelletized via an extrusion or pelletization process. The pellets are added in this case with the primer to the hot aggregate. However, because of their non-powderous nature they do not fully melt onto the aggregate and form a highly visco-elastic three-dimensional lattice throughout the voids filled with base binder. It is hypothesized that the base asphalt and the TLA form an inter-penetrating network while the primer covers the aggregate. In place of or in combination with the processing agent, other polymers and elastomers can be melted into the TLA when the objective is to maximize the asphalt cement (AC) content in order to obtain maximum film thickness or in order to enhance the visco-elastic properties of the lattice.

EXAMPLE 7

Application with Recycled Asphalt Pavement (RAP)

Figure 17:
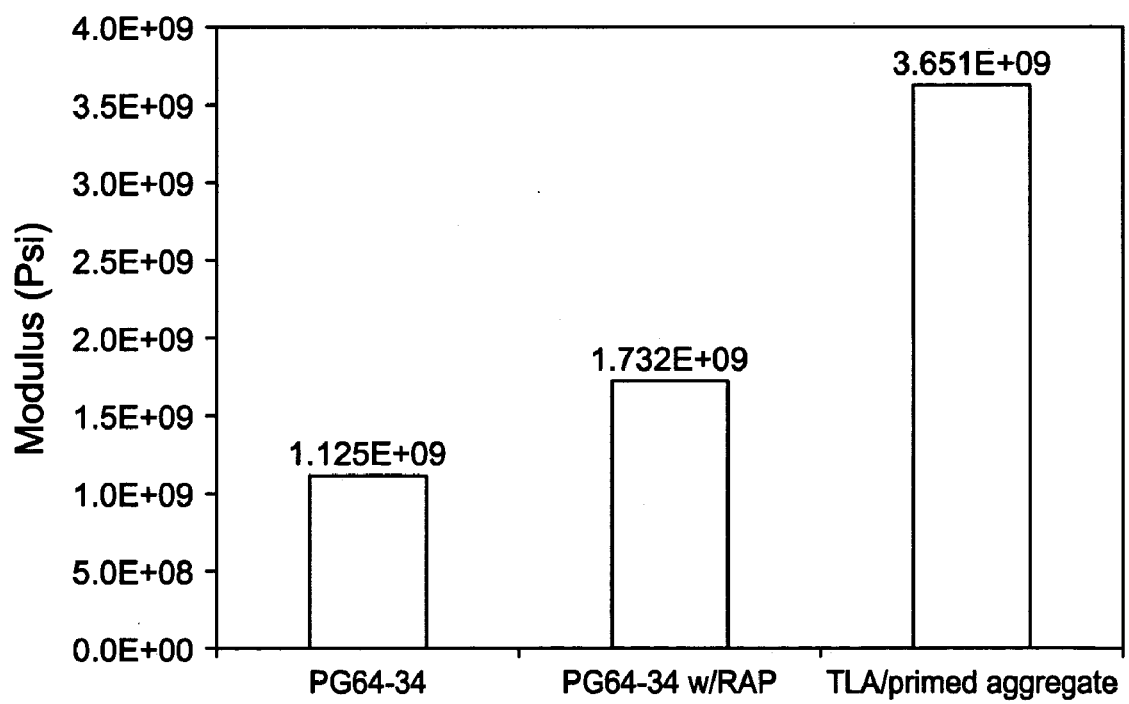
FIG. 17 is a graph comparing mix stiffness measurements for an asphalt concrete mix made in accordance with an embodiment of the present invention with two asphalt concrete mixes made in accordance with prior art methods.

The primer can be used in conjunction with RAP. Because the aged RAP base binder already covers the RAP aggregate, the primer is most effective coating the virgin aggregate portion. The RAP has substantially no unexposed polar aggregate surface. Preferably, the primer is added together with the RAP onto the hot aggregate via an RAP collar. As shown in FIG. 17, the primer enhances the mix modulus of RAP mixes significantly.

EXAMPLE 8

Improved Structural Load Bearing Capacity

As previously mentioned, the dynamic modulus is the most appropriate parameter to calculate the stresses and strains in the pavement. Ideally, one would use the flexural dynamic modulus, E*, however, because E* is generally more difficult to attain and requires more expensive testing equipment, AAHSTO (Association of American State Highway Transportation Officials) has proposed using the dynamic shear modulus, G*, in its place. The dynamic shear modulus G* and flexural E* are directly related via Poisson's ratio, ν, as shown in the following equation:

$$E^* = 2(1+\nu) \cdot G^*$$

In order to determine the effect of the increased mix moduli, which are shown in FIG. 17, an elastic layered analysis was carried out using the Julia program, which is the engine of the to-be-released AASHTO 2002 design guide. The tangential strains were predicted for both the RAP/PG70-28 mix, as well as the primed aggregate mix containing the same amount of RAP. The calculations were carried out at various pavement thicknesses.

Figure 18:
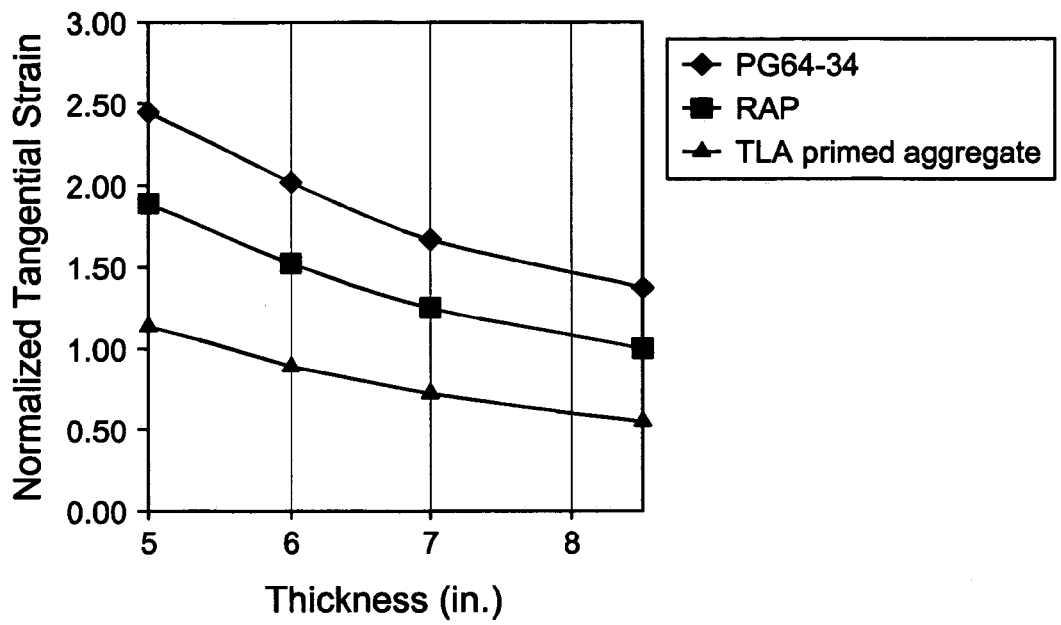
FIG. 18 is a graph comparing predicted tangential strains for an asphalt concrete mix made in accordance with an embodiment of the present invention with two asphalt concrete mixes made in accordance with prior art methods.

The results indicate that the thickness in one typical example can be reduced from 8.5" down to 5.5" without changing the expected normalized tangential strains (FIG. 18). Thus, the present study provides a comprehensive method to reduce pavement thickness without negatively affecting fatigue resistance of the pavement structure.

As an advantage of the present invention, the asphalt concrete made in accordance with embodiments of the present invention performs better in low temperature climates than prior art asphalt concrete mixtures. As shown by the examples, rutting, skidding, and other common problems are significantly decreased when using the asphalt concrete made in accordance with embodiments of the present invention.

While the invention has been shown in only a few of its forms, it should be apparent to those skilled in the art that it is not so limited but susceptible to various changes without departing from the scope of the invention.

I claim:

1. A process of producing asphalt concrete with enhanced performance utilizing a primer, the process comprising the steps of:
    (a) supplying a hot aggregate with a surface temperature of at least 380 deg. F;
    (b) mixing a primer and the hot aggregate for a period of time sufficient to melt the primer onto at least a portion of the aggregate surface, the melted primer forming a primer layer over at least the portion of the aggregate surface; and
    (c) mixing an asphalt base binder with the hot aggregate at least partially covered with the primer layer such that the primer layer forms a primer interlayer between the hot aggregate and the base binder, the resulting asphalt concrete having enhanced performance when compared with an aggregate and base binder combination in the absence of the prime.

2. The process according to claim 1, wherein the enhanced performance comprises enhanced fatigue life, enhanced rut and shoving resistance, and better retaining of low temperature properties of the base binder.

3. The process according to claim 1, wherein the primer comprises an asphalt component and an augmenter, the augmenter comprising a processing agent.

4. The process according to claim 3, wherein the asphalt component is selected from the group consisting of a natural asphalt, a shale asphalt, bottoms from a solvent deasphalting process, a hard asphalt, a blown asphalt, a stiff refined asphalt, a flux, and combinations thereof.

5. The process according to claim 3, wherein the processing agent is selected from the group consisting of an oligiomeric wax, a derivative if an oligiomeric wax, low molecular weight polyolefins, and combinations thereof.

6. The process according claim 5, wherein the derivative of an oligiomeric wax comprises a carboxylated derivative of the oligiomeric wax.

7. The process according to claim 5, wherein the primer comprises between about 3% to about 10% by weight of the total binder.

8. The process according to claim 5, wherein the period of time sufficient to melt the primer onto at least a portion of the aggregate surface is about 3 to 10 seconds.

9. The process according to claim 5, wherein the step of adding the primer includes utilizing a method selected from the group consisting of utilizing a bulk silo, utilizing a supersack, utilizing a meltable bag, and utilizing an auger.

10. The process according to claim 5, wherein the aggregate comprises recycled asphalt pavement.

11. A process of producing asphalt concrete with enhanced performance utilizing a primer, the process comprising the steps of:
  (a) supplying a hot aggregate with a surface temperature of at least 250 deg. F.;
  (b) mixing a primer and a hot aggregate for a period of time sufficient to melt the primer onto at least a portion of the aggregate surface, the melted primer forming a primer over at least the portion of the aggregate surface; and
  (c) mixing an asphalt base binder with the hot aggregate at least partially covered with the primer layer such that the primer layer forms a primer interlayer between the hot aggregate and the base binder, the resulting asphalt concrete having enhanced performance when compared with an aggregate and base binder combination in the absence of the primer,
  wherein the primer comprises an asphalt component and an augmenter, the augmenter comprising a processing agent, and
  wherein the asphalt component comprises pelletized Trinidad Lake Asphalt.

12. The process according to claim 11, wherein the primer further comprises a processing agent, the Trinidad Lake Asphalt being added in a four-to-one to twenty-to-one ratio to the processing agent.

13. The process according to claim 11 wherein the asphalt component further comprises a natural asphalt from the American Gilsonite Company with a trademarked name of Gilsonite, whose non-trademark name is uintahite.

14. A process of producing an aggregate and base binder combination with enhanced performance, the process comprising the steps of:
  (a) supplying a hot aggregate with a surface temperature of at least 380 deg. F;
  (b) mixing a primer and the hot aggregate for a period of time sufficient to melt the primer onto at least a portion of the aggregate surface, the melted primer forming a layer over at least a portion of the aggregate surface; and
  (c) mixing a base binder to the hot aggregate at least partially covered with the primer layer such that the primer layer forms a primer interlayer between the hot aggregate and the base binder, the resulting aggregate and base binder combination having enhanced performance when compared with an aggeregate and base binder combination in the absence of the primer.

15. An asphalt concrete having enhanced performance comprising:
  (a) a hot aggregate with a surface temperature of at least 250 deg. F.;
  (b) a primer that has been added to the hot aggregate prior to addition of an asphalt base binder, the primer being melted on to at least a portion of the hot aggregate and subsequently forming a primer interlayer between the hot aggregate and the base binder; and
  (c) the asphalt base binder, the resulting asphalt concrete having enhanced performance when compared with an aggregate and base binder combination without a primer being added,
  wherein the primer comprises and asphalt component and an augmenter, the augmenter comprising a processing agent, and
  wherein the asphalt component comprises pelletized Trinidad Lake Asphalt.

16. The asphalt concrete according to claim 15, wherein the hot aggregate has a surface temperature of at least 340 deg. F.

17. The asphalt concrete according to claim 15, wherein the hot aggregate has a surface temperature of at least 380 deg. F.

18. The asphalt concrete according to claim 15, wherein the processing agent is selected from the group consisting of an oligiomeric wax, a derivative of an oligiomeric wax, a low molecular weight polyolefins, and combinations thereof.

19. The asphalt concrete according to claim 15, wherein the derivative of an oligiomeric wax comprises a carboxylated derivative of the oligiomeric wax.

20. The asphalt concrete according to claim 15, wherein the primer further comprises a processing agent, the Trinidad Lake Asphalt being in a four-to-one to twenty-to-one ratio to the processing agent.

21. The asphalt concrete according to claim 15, wherein the primer comprises between about 3% to about 10% by weight of the total binder.

22. The asphalt concrete according to claim 15, wherein the aggregate comprises recycled asphalt pavement.

23. The process according to claim 15 wherein the asphalt component further comprises a natural asphalt from the American Gilsonite Company with a trademarked name of Gilsonite, whose non-trademarked name is uintahite.

* * * * *

UNITED STATES PATENT AND TRADEMARK OFFICE
CERTIFICATE OF CORRECTION

PATENT NO. : 7,264,667 B2  Page 1 of 1
APPLICATION NO. : 11/181229
DATED : September 4, 2007
INVENTOR(S) : Mark G. Bouldin It is certified that error appears in the above-identified patent and that said Letters Patent is hereby corrected as shown below:

<u>In column 16</u>:

Claim 19, line 41, please delete "15" and insert --18--.
Claim 23, line 54, please delete "process" and insert --asphalt concrete--.

Signed and Sealed this

Seventh Day of July, 2009

JOHN DOLL
*Acting Director of the United States Patent and Trademark Office*